US012240008B2

(12) United States Patent
Ketterling

(10) Patent No.: US 12,240,008 B2

(45) Date of Patent: Mar. 4, 2025

(54) SPRINKLER RISER EXTENSION KIT

(71) Applicant: Kody J. Ketterling, Twin Falls, ID (US)

(72) Inventor: Kody J. Ketterling, Twin Falls, ID (US)

( * ) Notice: Subject to any disclaimer, the term of this patent is extended or adjusted under 35 U.S.C. 154(b) by 0 days.

(21) Appl. No.: 18/135,699

(22) Filed: Apr. 17, 2023

(65) Prior Publication Data

US 2023/0249212 A1 Aug. 10, 2023

Related U.S. Application Data

(63) Continuation of application No. 17/080,800, filed on Oct. 26, 2020, now Pat. No. 11,654,447, which is a continuation-in-part of application No. 16/377,199, filed on Apr. 6, 2019, now Pat. No. 10,814,343.

(60) Provisional application No. 62/725,970, filed on Aug. 31, 2018.

(51) Int. Cl.
*B05B 15/656* (2018.01)
*B05B 1/26* (2006.01)

(52) U.S. Cl.
CPC ............ *B05B 15/656* (2018.02); *B05B 1/267* (2013.01)

(58) Field of Classification Search
CPC .............................. B05B 15/656; B05B 1/267
See application file for complete search history.

(56) References Cited

U.S. PATENT DOCUMENTS 4,018,386 A 4/1977 Barichello
D248,568 S 7/1978 Ismach
D253,245 S 10/1979 Allenbaugh, Jr.
4,220,283 A 9/1980 Citron
D289,542 S 4/1987 Byrne
4,919,332 A 4/1990 Bailey
D319,291 S 8/1991 Hanzel
5,133,501 A 7/1992 Marshall
(Continued)

OTHER PUBLICATIONS

Amazon ("231 Irrigator-Pro 6.5-Inch Universal Sprinkler SPRAY Riser Extension"). https://www.amazon.com/dp/B07491V94Y/ref=sspa_dk_detail_7?bsc=1&pd_rd_i=B07491V94Y&pd_rd_wg=554kv&pd_rd_r=3CZ97A2SA62QZPPFVCPF&pd_rd_w=pZvHF. Apr. 28, 2018.

(Continued)

*Primary Examiner* — Tuongminh N Pham
(74) *Attorney, Agent, or Firm* — Burdick Patents, P.A.; Sean D. Burdick; Colin L. Honan

(57) ABSTRACT

A sprinkler riser extension kit elevates a pop-up sprinkler that has a riser and a head detachable from the riser. The kit includes a gripping head having a channel extending therethrough, and a riser extension configured to slide within the channel and having a length corresponding to the length of the channel. The lower end of the gripping head is configured for attachment to the sprinkler, e.g., by a plurality of flexible pawls spaced evenly about the lower end, or alternatively to an upper portion of an identical gripping head. The riser extension includes means for attachment between the sprinkler head and the sprinkler riser. To elevate the sprinkler, the head is detached, the riser passed through the gripping head, the riser extension attached to the riser, the head attached to the riser extension, and the gripping head attached to the top of the sprinkler. Gripping heads and riser extensions are stackable atop one another, to enable elevation of the sprinkler head in multiple stages.

19 Claims, 7 Drawing Sheets

SECTION A-A

SECTION C-C

(56) References Cited

U.S. PATENT DOCUMENTS

| | | | |
|---|---|---|---|
| 5,226,599 | A | 7/1993 | Lindermeir et al. |
| 5,918,812 | A | 7/1999 | Beutler |
| 5,996,905 | A | 12/1999 | Bedford |
| 6,000,632 | A | 12/1999 | Wallace |
| 6,050,500 | A | 4/2000 | Ensworth |
| 6,138,924 | A | 10/2000 | Hunter et al. |
| 6,193,168 | B1 | 2/2001 | Bedford |
| 6,478,237 | B2 | 11/2002 | Kearby et al. |
| 6,502,764 | B2 | 1/2003 | Walker |
| 6,629,648 | B1 | 10/2003 | Jones |
| 6,641,177 | B1 | 11/2003 | Pinciaro |
| 6,648,241 | B1 | 11/2003 | Doshay |
| 6,874,696 | B1 | 4/2005 | Ericksen et al. |
| D616,961 | S | 6/2010 | Goetz |
| 7,832,659 | B1 | 11/2010 | Collins |
| 8,430,339 | B2 | 4/2013 | Stewart et al. |
| D734,868 | S | 7/2015 | Gilboa |
| 9,192,956 | B2 | 11/2015 | Kah et al. |
| D757,933 | S | 5/2016 | Lev et al. |
| 9,339,438 | B2 | 5/2016 | Lev et al. |
| D765,837 | S | 9/2016 | Lev et al. |
| D767,124 | S | 9/2016 | Lev et al. |
| 9,481,003 | B2 | 11/2016 | Clark et al. |
| 9,539,602 | B2 | 1/2017 | Wright et al. |
| 9,699,974 | B2 | 7/2017 | Clark et al. |
| 9,765,913 | B2 | 9/2017 | Magargal et al. |
| D801,522 | S | 10/2017 | Shalom |
| D861,054 | S | 9/2019 | Avila et al. |
| D883,446 | S | 5/2020 | Comstock |
| 10,806,667 | B2 | 10/2020 | Denenburg et al. |
| D907,176 | S | 1/2021 | Qiang |
| D909,606 | S | 2/2021 | Maibach, Jr. |
| D916,265 | S | 4/2021 | Jung et al. |
| D920,469 | S | 5/2021 | Babaie |
| D921,151 | S | 6/2021 | Cho et al. |
| D924,361 | S | 7/2021 | Matsushita et al. |
| 2002/0039522 | A1 | 4/2002 | Hartmann et al. |

OTHER PUBLICATIONS

Amazon: https://www.amazon.com/10-Pack-Cut-off-Sprinkler-Extension/dp/BOOLORBMU0. Apr. 28, 2018.

EP Search Report and Written Opinion mailed on Nov. 16, 2022, to EP Patent Application No. 20788430.5.

https://www.doityourself.com/stry/3-sprinkler-riser-types. Apr. 28, 2018.

https://www.irrigationtutorials.com/sprinkler-head-risers/. Apr. 28, 2018.

Hunter Sprinkler 8A Pro Adjustable Radius Nozzle, Oct. 18, 2015, Amazon.com, Sep. 1, 2021, URL: https://www.amazon.com/dp/B00FYQWMPQ (Year: 2015).

Installing Risers & Sprinkler Heads: https://www.hometips.com/diy-how-to/sprinkler-heads-risers-installing.html . Apr. 28, 2018.

International Preliminary Report on Patentability issued on Oct. 21, 2021 for PCT/US2020/026731.

International Search Report and Written Opinion issued on May 11, 2020 for PCT/US20/26731.

Modtek Replacement Pop UP sprinkler Heads, Jun. 7, 2019, Amazon.com, Sep. 1, 2021. URL: https://www.amazon.com/Modtek-replacement-Sprinkler-RainBird-Sprinklers/dp/B07QJTDT2H (Year: 2019).

Orbit 54009 Full Spray Pattern Plastic Shrub Head with Plastic Nozzle, Jun. 11, 2016, Amazon.com, Sep. 9, 2021, URL: https://www.amazon.com/Orbit-54009-Pattern-Plastic-Nozzle/dp/B00004S1TH (2016).

Orbit 54010 Shrub and Plant Sprinkler Head, Jul. 29, 2016, Amazon.com, Sep. 9, 2021, URL: https://www.amazon.com/dp/B00004S1TI (2016).

Orbit 54023 Adjustable Pattern Shrub Head Sprinkler, Sep. 17, 2019, Amazon.com, Sep. 9, 2021, URL: https://www.amazon.com/Orbit-54023-Adjustable-Pattern-Sprinkler/dp/B006ZN225C (2019).

Pop-Up Sprinkler Riser Extension, Aug. 29, 2020, homedepot.com, Sep. 1, 2021, URL:https://www.homedepot.com/p/KAP-IT-Pop-Up-Sprinkler-Riser-Extension-Attach-to-Top-of-Pop-Up-1-5-lift-Pop-Up-Kap-Virtually-NO-Digging-2-pk-Kap-02R/313655761 (Year: 2020).

Sprinkler Fittings: https://www.hometips.com/buying-guides/sprinkler-pipes-fittings.html. Apr. 28, 2018.

Sprinkler Lift product: https://www.sprinklerlift.com. Apr. 28, 2018.

Sprinkler System Store: http://www.sprinklersystemstore.com/sprinkler-systems-sprinkler-system-parts/sprinkler-risers/?sort=alphaasc&page=3. Apr. 28, 2018.

Sprinkler Warehouse: http://www.sprinklerwarehouse.com/Shrub-Sticks-Risers-s/225.htm. Apr. 28, 2018.

Sprinkler Warehouse: https://www.sprinklerwarehouse.com/Riser-Extension-p/37056.htm. Apr. 28, 2018.

SECTION A-A

SECTION B-B

DETAIL D

SPRINKLER RISER EXTENSION KIT

RELATED APPLICATIONS

This application is a continuation of and claims priority to U.S. patent application Ser. No. 17/080,800 filed Oct. 26, 2020, which is a continuation-in-part of and claims priority to U.S. patent application Ser. No. 16/377,199 filed Apr. 6, 2019, which claims priority to U.S. Provisional Application 62/725,970 filed Aug. 31, 2018, all of which are fully incorporated herein by reference.

BACKGROUND OF THE INVENTION

Field of the Invention

The present invention relates generally to irrigation systems, and more particularly to a retrofit riser kit for lawn sprinklers, especially pop-up sprinklers.

Description of Related Art

Heads for pop-up sprinklers in irrigation systems, particularly those installed in lawns and gardens, become buried over time due to soil build-up and grass growth in the immediate vicinity of the sprinkler head. This causes blockage of the pop-up action or blockage of water flow, rendering the sprinkler unable to provide desired irrigation coverage.

A conventional solution is to dig away the grass and dirt around the sprinkler head, then remove the sprinkler head from its riser (usually made of PVC), and add length to the riser by cutting and cementing a riser extension in place. After the cement cures, the sprinkler head can then be reinstalled to the riser extension at a higher elevation above the lawn.

The conventional solution, however, is labor intensive and time consuming, and also risks introducing dirt and other debris into the sprinkler line that can clog sprinkler heads and cause further problems later on. Other solutions involve installing risers internal to the sprinkler head mechanism, but these are also time consuming because they require that the sprinkler cap be removed and its internal mechanism reconstructed. Those solutions are also structurally specific to a particular make and model of sprinkler head.

What is needed is a universal riser that fits multiple makes and models of sprinkler heads, that is easy to install, and that doesn't require digging up the sprinkler or cutting and cementing irrigation lines.

SUMMARY OF THE INVENTION

The foregoing problems are overcome by a sprinkler riser extension kit according to the present invention. In a basic embodiment, the extension kit consists of two cooperating parts: an external gripping head ("gripping head"), and an internal riser extension ("riser extension"). Both the gripping head and the internal riser extension are configured to be stacked on one another to extend the height of a sprinkler riser in as many stages as desired. That is, the lower end of each gripping head can mate to an upper end of an identical gripping head, and the lower end of the internal riser extension can be connected to an upper end of an identical internal riser extension.

The gripping head may be sized to at least partially cover the cap of a conventional sprinkler head, either in an off-the-shelf condition or in a condition of prior installation in an irrigation system. In one embodiment the gripping head has an upper end and a lower end, and a channel extending through the upper end and lower end, wherein the lower end includes a means for attachment to a sprinkler. The riser extension is configured to slide within the channel, and has a first attachment means configured for attachment to a head of the sprinkler, and a second attachment means configured for attachment to a riser of the sprinkler from which the head of the sprinkler is detached.

The channel may run centrally through the gripping head, such that the channel is concentrically aligned with a central rotational axis of the gripping head. The channel preferably has a height substantially equal to the length of the riser extension, and allows for tight passage of the riser extension therethrough. In one embodiment, the attachment means at the lower end of the gripping head is configured with a plurality of pawls for facilitating removable attachment of the gripping head to the cap of the sprinkler head. The pawls may be evenly spaced about the perimeter of the lower end, and each pawl may include an inwardly projecting flexible finger that snap-fits to the cap when the gripping head is pressed downward over the cap. The upper end of the gripping head may also include one or more outwardly projecting tabs to provide a means for rotating the gripping head by hand. The top surface of the gripping head may include a rim surrounding the entrance to the cylindrical channel that acts as a stop to prevent passage of a sprinkler head therethrough.

In one embodiment, the riser extension is generally cylindrical, and may comprise a length of pipe having the first and second attachment means at opposing ends, which may be threaded attachments. Preferably, the riser extension includes male threading at its upper end configured to engage female threading of the sprinkler head. At its lower end, the riser extension may include female threading of similar configuration. Preferably, the riser extension has an outer surface configured to allow the riser extension to slide tightly but freely against interior walls of the channel when subjected to a pop-up force of the sprinkler. In another embodiment, the lower end of the riser extension may include a rim having a plurality of ridges formed on a bottom surface of the rim that act as a lock washer when the riser extension is fully attached to the sprinkler riser.

In another embodiment, a sprinkler riser extension kit according to the invention includes a gripping head and a riser extension. The gripping head is configured for removable attachment alternatively to both of a top end of a sprinkler and an upper end of an identical gripping head. The gripping head further defines a channel extending through the gripping head. The riser extension is configured to slide within the channel, and is further configured for attachment between: a head of the sprinkler, and a riser of the sprinkler from which the head of the sprinkler is detached. The width of the channel substantially equals the width of the sprinkler riser, or the width of the riser extension, or both, and the length of the channel corresponds to the length of the riser extension.

Another embodiment of the invention provides a kit for elevating a pop-up sprinkler having a riser and a head detachable from the riser, wherein the kit includes a gripping head and a riser extension. The gripping head is configured for attachment alternatively to both of a top end of the pop-up sprinkler and an upper end of an identical gripping head. The gripping head further defines a channel configured for passage of the riser of the pop-up sprinkler therethrough. The riser extension is configured to pass through the channel and is further configured to attach between the riser of the pop-up sprinkler and the head of the pop-up sprinkler.

In operation, the kit is configured so that an operator can raise a sprinkler riser through the cap of a pop-up sprinkler, remove the head of the pop-up sprinkler from its riser, pass the sprinkler riser through the channel of the gripping head, and attach the riser extension at its lower end to the top of the sprinkler. The sprinkler head can then be attached to the upper end of the riser extension, and the gripping head can then be attached to the cap, e.g. by pressing the gripping head downward until the pawls snap into place around the rim of the cap, to complete the installation and effectively extend the elevation of the sprinkler head according to the length of the riser extension. The stackable feature of the gripping head and internal riser extension allows the operator to extend the elevation of the sprinkler head in as many stages as desired.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions disclosed or shown are exemplary only. In the drawings, like reference numerals may designate like parts throughout the different views, wherein:

DETAILED DESCRIPTION OF THE INVENTION

The foregoing problems installing risers on existing pop-up sprinklers are overcome by a sprinkler riser extension kit according to the present invention. In one embodiment, the extension kit consists of two cooperating parts: an external gripping head ("gripping head"), and an internal riser extension ("riser extension").

Figure 1:
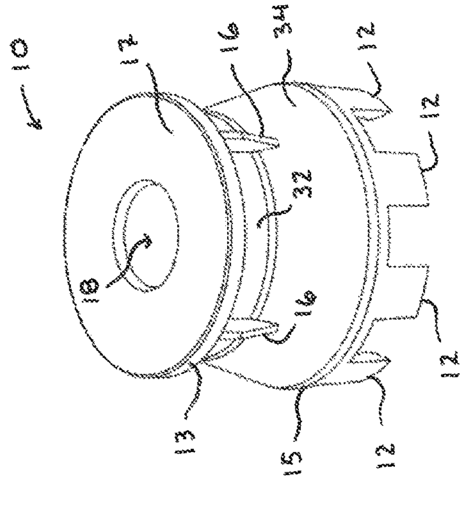
FIG. 1 is a perspective view of one embodiment of an external gripping head of a sprinkler riser extension kit according to the present invention.

FIG. 1 shows one embodiment according to the invention of a gripping head 10 for a sprinkler riser extension kit. Preferably, the gripping head 10 is formed as a singular component, for example, by an injection molding process using ABS or acetal plastic. In other embodiments, the gripping head 10 may be formed by machining, forging, or three-dimensional printing, from any generally rigid material among many suitable metals and plastics. Preferably, the gripping head 10 has a generally cylindrical form. In one embodiment, the gripping head 10 has an overall height of about 2.5 in. and a width or diameter of about 2.0 to 2.25 in.

The lower end of gripping head 10 is configured for removable attachment to the cap 24 of a sprinkler 22 that may be any one of a variety of commercially available pop-up sprinklers, such as those manufactured by Hunter®, Rainbird®, Toro® and others. The configuration of the lower end of gripping head 10 that provides the means for removable attachment of the gripping head to the cap of a sprinkler may vary. For example, the removable attachment means may comprise a threaded connection, a clamp, a friction-fit, a locking device such as a tab-and-slot connection, or any combination of the foregoing.

In one embodiment, as shown in FIGS. 1-4, a gripping head 10 removably attachable to a sprinkler may include a plurality of flexible claws, or pawls 12, for facilitating removable attachment of the gripping head 10 to the cap portion 24 of any of various conventional pop-up sprinkler heads. The pawls 12 are preferably spaced evenly about the perimeter of the lower end of gripping head 10. Each pawl 12 may be angled slightly inward. Alternatively, each pawl 12 may include a finger portion 14 that projects inwardly from an inner surface of each pawl toward the axis of the gripping head. To project inwardly means that a finger portion 14 extends in a direction toward and perpendicular to an axis of rotation 11 that is defined as an imaginary vertical line running through the center of the gripping head 10. By way of illustration, the rotational axis 11 lies in the same plane as Section line A-A in the side view of FIG. 2, and emerges normal to the page at the origin point 11 shown in FIG. 4. Finger portion 14 preferably forms a rounded or wedge-shaped protrusion on the inner surface of each pawl. The dimensions of the pawl 12 are chosen to form a durable and resilient spring so that the pawl will flex and bend outward in response to downward pressure of the claws against the cap of a conventional pop-up sprinkler, and then snap inward when the finger portion 14 of the pawl is forced past a rim 28 of the cap 24. In this manner, each pawl 12 attaches tightly to the cap, gripping the cap and resisting detachment by detent action of the pawls.

Figure 2:
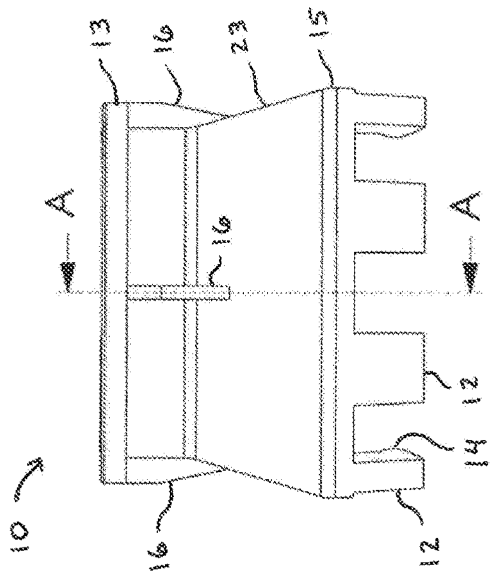
FIG. 2 is a side view of the gripping head of FIG. 1.

FIG. 2 shows a side view of the gripping head 10. In this view, four pawls 12 are visible at the lower end of gripping head 10, and another four pawls 12 are hidden from sight. Thus, this embodiment there are a total of eight pawls 12 angularly spaced about the lower end of the gripping head at regular intervals. In one implementation of the invention, each pawl 12 may be about 0.4 in. in length, and the spacing between any two adjacent pawls 12 may be about 0.5 in. The width of each pawl 12 may be about 0.44 in. Other numbers, arrangements, and dimensions of pawls 12 are possible within the scope of the invention.

On an upper portion of the gripping head 10, one or more outwardly projecting tabs 16 may be formed at one or more locations about the perimeter of the gripping head to provide a means for rotating the gripping head 10 by hand. Outwardly projecting means that tabs 16 extend in a direction away from and perpendicular to the axis of rotation 11. In a preferred embodiment, four tabs 16 are formed about the gripping head, each spaced apart angularly by 90 degrees. Each tab 16 may be about 0.5 in. high, and about 0.08 in. wide. Other numbers, arrangements, and dimensions of tabs 16 are possible within the scope of the invention.

Figure 3:
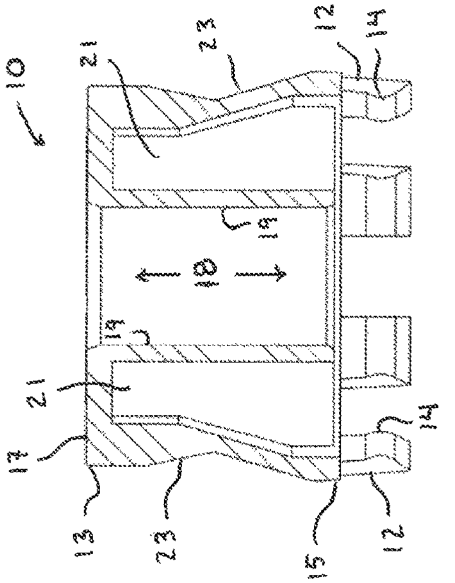
FIG. 3 is a cross-sectional side view of the gripping head taken along Section A-A of FIG. 2.

FIG. 3 shows a cross-sectional side view of the gripping head 10 taken along Section A-A of FIG. 2. A channel 18 is shown extending centrally through the top surface 17 of gripping head 10 from an upper rim 13 of the gripping head to a lower rim 15 of the gripping head. Channel 18 is preferably cylindrical, and may be concentrically aligned with the rotational axis 11. Channel 18 may have a height substantially equal to the length of the riser extension 20, and an inner diameter (or other geometry) that allows for snug passage of the riser extension 20 therethrough, as a piston through a cylinder.

In one embodiment, gripping head 10 may be constructed with one or more interior voids 21 formed between an inner wall 19 of the gripping head and an outer wall 23 of the gripping head. The inner wall 19 of the gripping head defines a boundary around the vertical channel 18. The outer wall 23 of the gripping head forms an exterior side surface all around the perimeter of the gripping head 10. The interior voids 21 reduce the amount of material needed to form the gripping head, to thereby advantageously reduce the weight of the gripping head and also minimize manufacturing costs.

The outer wall 23 may be cylindrical, rectangular, or another multi-sided geometry, and is preferably ergonomically designed to facilitate grasping or manipulating by hand. Outer wall 23 may also be partially conical or circular, and may combine various of the foregoing or following geometrical features as a means for manual operation. For example, in the embodiment shown in the figures, the outer wall 23 comprises that part of the exterior surface of the gripping head 10 that lies between the upper rim 13 and the lower rim 15. This part of the exterior surface includes a cylindrical portion 32 and a conical portion 34 (FIG. 1). This particular structure allows an operator to get a firm grip on gripping head 10 by grasping and pressing thumb and forefingers underneath the upper rim 13, above the conical portion 34, and against the tabs 16 for reliable handling, pressing, lifting, and rotating.

Figure 4:
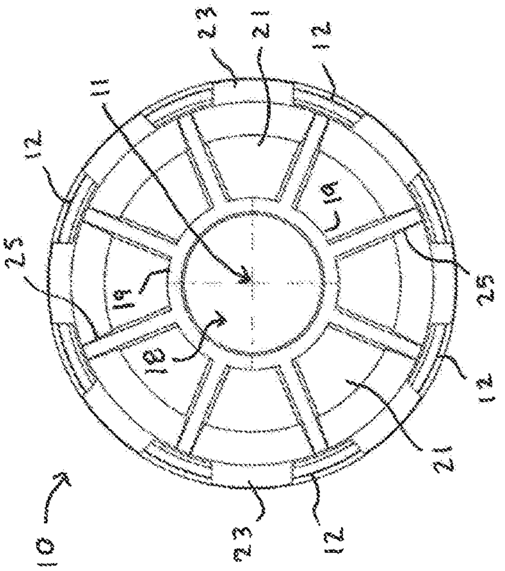
FIG. 4 is a bottom view of the gripping head of FIG. 1.

FIG. 4 shows a bottom view of the gripping head 10. This view shows the point through which axis 11 passes into and out of the page. Eight interior voids 21 are shown between the inner wall 19 and outer wall 23. A vertical divider 25 separates each adjacent pair of interior voids 21. In this embodiment there are eight vertical dividers 25, formed at regular angular intervals around the axis 11. Each vertical divider 25 extends from the inner wall 19 to the outer wall 23, from the lower end of the gripping head 10 to the top surface 17. Preferably, the vertical dividers 25 are integrally formed along with all other parts of the gripping head by a casting or injection molding process. The vertical dividers 25 serve to maintain the structural integrity of a gripping head 10 that is formed with one or more voids 21, while minimizing the mass and manufacturing cost of the gripping head. In other embodiments, there may be different numbers of vertical dividers 25, spaced at regular or irregular intervals. Alternatively, the gripping head 10 may be formed with a solid interior surrounding vertical channel 18, with no vertical dividers or voids.

FIGS. 5 to 8 show one embodiment of an internal riser extension 20 for a sprinkler riser extension kit according to the invention. Preferably, the riser extension 20 is also formed as a singular component, for example, by an injection molding process using ABS or acetal plastic. In other embodiments, the riser extension 20 may be formed by machining, forging, or three-dimensional printing, from any generally rigid material among many suitable metals and plastics. The riser extension 20 may also be machined from pipe stock.

Figure 5:
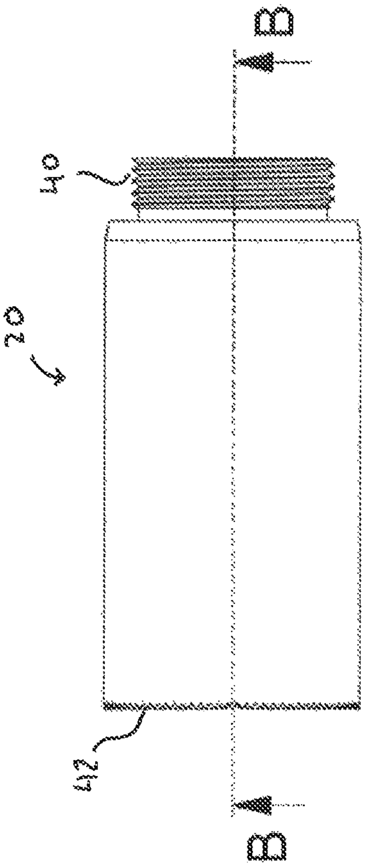
FIG. 5 is a side view of one embodiment of an internal riser extension of a sprinkler riser extension kit according to the present invention.

FIG. 5 shows a side view of the internal riser extension 20. In one embodiment, the riser extension 20 includes a first attachment means 40, for attaching to a conventional pop-up sprinkler head 27. For example, the first attachment means 40 may include male threading at the top end of the riser extension (i.e. the right-most end as shown in FIG. 5) that is configured to threadably engage with female threading of a conventional pop-up sprinkler head, e.g. 28⅝ threads or otherwise. On the opposite or lower end, the riser extension 20 may be configured with a second attachment means 42, for attaching to a riser 26 of the conventional pop-up sprinkler. For example, the second attachment means 42 may include female threading similar to that of the first attachment means. Preferably, one or both of the first and second attachment means 40, 42 comprise a removable attachment means. Other structures for the first and second attachment means 40, 42 are possible within the scope of the invention, for example, means such as a compression fitting, a pipe clamp, an adhesive, a weld, a spring-loaded connector, and a pipe fitting or junction. Whatever structure is used for the attachment means 40 and 42, the outer surface or outer diameter of the riser extension 20 should be sized to allow it to slide tightly, i.e. freely yet snugly with minimal friction, within and against the internal wall of the vertical cylindrical channel 18, when assembled as depicted herein and when subjected to a spring force or a pop-up force delivered by a conventional pop-up sprinkler. In one embodiment, the outer diameter of the riser extension 20 is about 0.6 in. The length of the riser extension 20 preferably conforms substantially to the length of the cylindrical channel 18.

Figure 6:
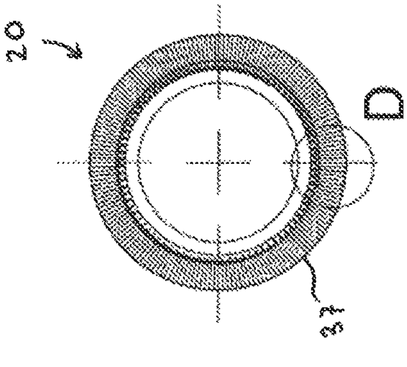
FIG. 6 is a bottom view of the internal riser extension of FIG. 5.
Figure 7:
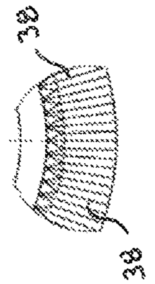
FIG. 7 is a magnified view of a portion of FIG. 6.

FIG. 6 shows a bottom view of the internal riser extension of FIG. 5, and FIG. 7 shows a magnified view of a portion of FIG. 6. These figures illustrate an optional feature according to the invention on a riser extension 20, wherein the rim 37 of the lower end of the riser extension 20 may be configured with a plurality of sharp ridges 38 formed on the bottom surface of the rim 37. The ridges 38 cause the bottom surface of rim 37 to bite into the mating surface of a conventional riser when the riser extension 20 is threaded into full engagement with mating threads of the conventional riser. The ridges 38 thereby act as a lock washer, fixing the mating surfaces as they are rotated into engagement, while preventing disengagement by counter-rotation that is imparted without substantial effort. In one embodiment, the ridges 38 have a height of about 0.02 in., and each ridge is separated from an adjacent ridge by about 0.015 in.

Figure 8:
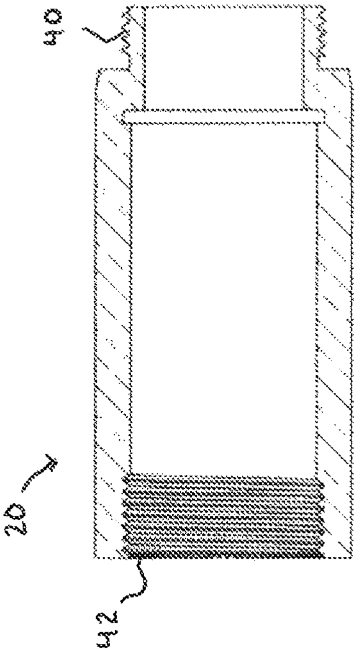
FIG. 8 is a cross-sectional side view of the internal riser extension taken along Section B-B of FIG. 5.

FIG. 8 shows a cross-sectional side view of the riser extension 20 taken along Section B-B of FIG. 5. This view illustrates exemplary proportions for, and internal configuration of, the riser extension 20. In one embodiment, the overall length of the riser extension 20 may be between about 1.5 to 2.0 in. The length of the threaded portion 40 (first attachment means) or threaded portion 42 (second attachment means) may be about 0.18 to 0.22 in.

Figure 10:
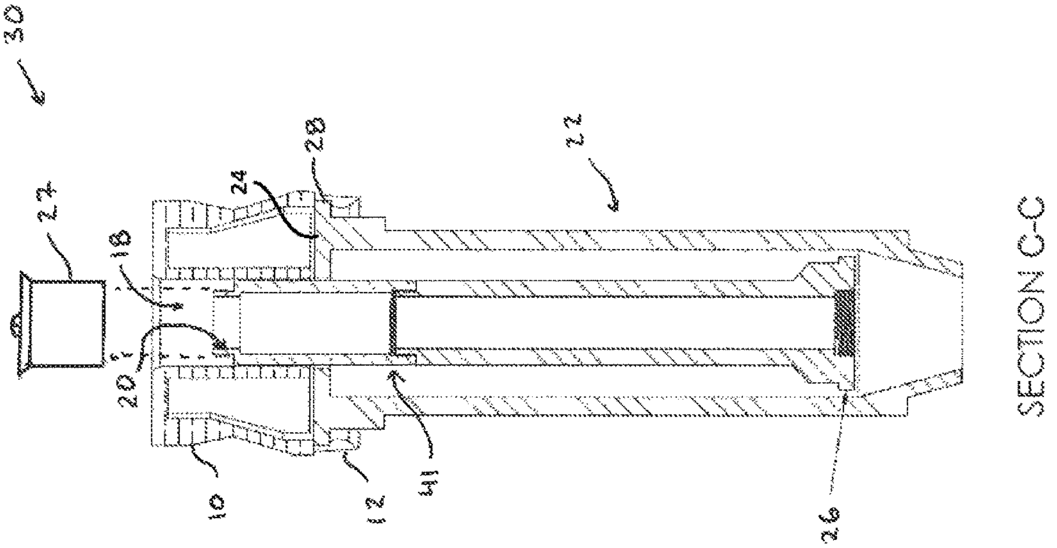
FIG. 10 is a cross-sectional side view of the sprinkler riser extension kit in the same condition of use in FIG. 8, taken along Section C-C.
Figure 9:
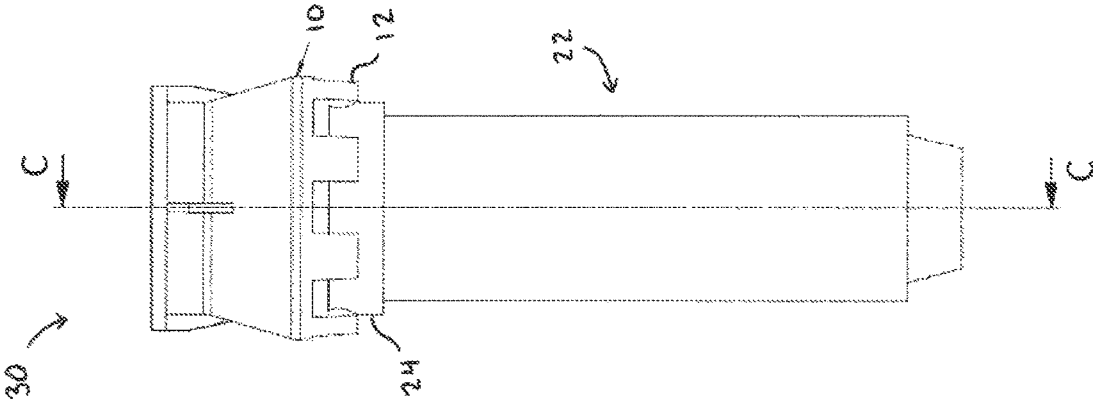
FIG. 9 is a side view of one embodiment of a sprinkler riser extension kit in a condition of use as installed on a conventional pop-up sprinkler.

FIG. 9 shows a side view of one embodiment of a sprinkler riser extension kit in an assembled condition 30 as installed on a conventional pop-up sprinkler 22. Internal parts of the assembly 30 are shown in the cross-sectional side view of FIG. 10, which is taken along Section C-C of FIG. 9, and in which the sprinkler head 27 is shown in exploded view above the assembly for purposes of illustration. The assembly 30 may be achieved by a method according to the invention for extending a height of a sprinkler, as follows: A technician first raises the sprinkler riser 26 through the cap 24, against a pop-up spring restoring force, to fully expose the sprinkler head 27. The sprinkler head 27 can then be removed from the top 41 of sprinkler riser 26. Sprinkler riser 26 may then be passed through the channel 18 of the gripping head 10, and the riser extension 20 can then be attached at its lower end to the top 41 of the sprinkler riser 26. The sprinkler head 27 can then attached onto the upper end of the riser extension 20, and the gripping head 10 can then be attached to the cap 24 as a final step. In the embodiment shown, the final step may be achieved by pressing the gripping head 10 onto the cap 24 until the pawls 12 snap into place around the rim 28 of the cap 24 as shown, to complete the installation and effectively extend the elevation of the sprinkler head 27 of sprinkler 22 according to the length of the riser extension 20.

In alternative embodiments of the method, the gripping head 10 may be attached to the cap 24 at any time after passage of sprinkler riser 26 through channel 18. Where the means for attaching the gripping head 10 to the sprinkler 22 includes the plurality of pawls 12, a technician can effect the attachment step by grasping the gripping head 10 and pushing it downward onto the cap 24, forcing pawls 12 around the top of the cap 24 until the gripping head snaps into place around rim 28.

A configuration of a gripping head 10 that includes the plurality of pawls 12 disposed about the lower end of the gripping head provides another advantage when installing a sprinkler riser kit according to the invention onto a buried or partially buried sprinkler 22. Prior to the installation, a technician can place the gripping head 10 over the cap 24, with or without snap-fitting the pawls to the cap, and rotate the gripping head. By rotating the gripping head 10 in opposite directions, the pawls 12 can be used to clear away grass, dirt, and other debris from around the cap 24. This will prevent the debris from entering the sprinkler 22 and potentially clogging the head or interfering with internal mechanisms. The gripping head 10 may thus be configured with a means for clearing debris from a buried or partially buried sprinkler.

Figure 11:
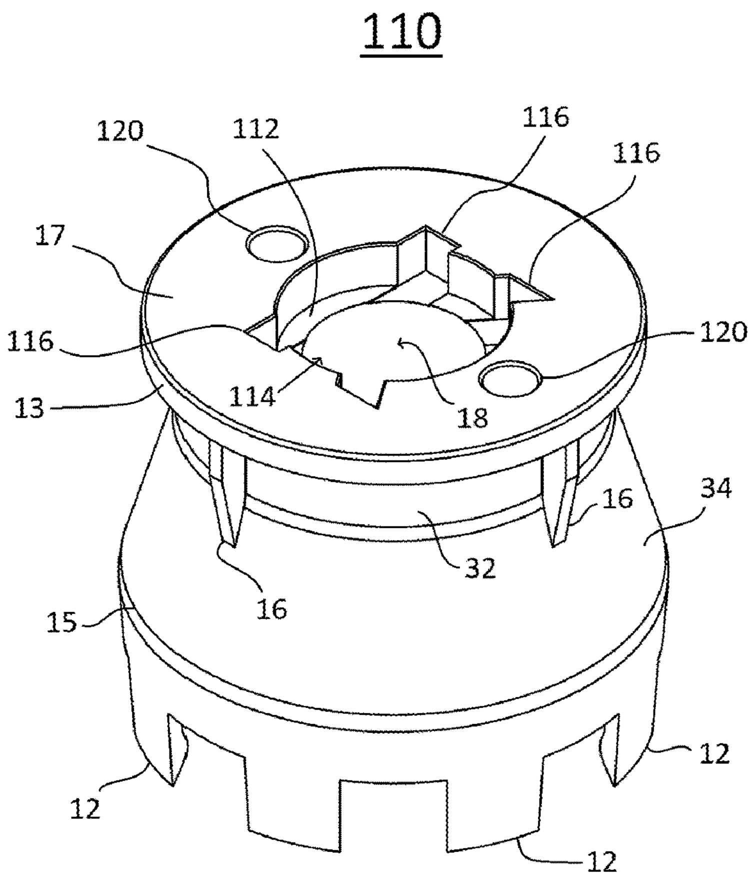
FIG. 11 is a perspective view of an embodiment of an external gripping head of a stackable sprinkler riser extension kit according to the present invention.

FIG. 11 shows a perspective view of an embodiment of an external gripping head 110 of a stackable sprinkler riser extension kit according to the present invention. The gripping head 110 is similar to the gripping head 10, and differs from gripping head 10 only by the addition of several structural features formed in the top surface 17 around or within the vertical channel 18. On gripping head 110, the upper end of the vertical channel 18 is widened and a shelf 112 is provided to define a recessed area 114 above the shelf 112 for receiving a flanged sprinkler head when a pop-up sprinkler is depressurized and the sprinkler head retracts downward into the gripping head. The shelf 112 provides a secure seat for the flanged rim of the sprinkler head (not shown). In one embodiment, the depth of the shelf 112 from the top surface 17 may be about 0.25 in. By providing the recessed area 114 for receiving a sprinkler head, the gripping head 110 effectively protects the sprinkler head from accidental damage as it would otherwise be exposed to lawnmower blades or other potentially harmful impacts.

Also on gripping head 11 are formed one or more head access channels 116. The head access channels 116 are provided adjacent to the recessed area 114, to allow an operator to grip the underside of a recessed rim of a sprinkler head, to facilitate raising of the sprinkler head. The head access channels may have any shape, and may have the same depth as shelf 112, or may have a slightly greater depth than the depth of the shelf 112. In one embodiment, the shape of the head access channels may resemble a logo of the gripping head manufacturer.

Also formed into the top surface 17 are two key holes 120. The keyholes 120 are preferably located equidistant from, and on opposite sides of the edge of the recess area 114. The keyholes 120 are sized to engage with tines of a turning tool, fork, or turn-on key that is commonly used to rotate valves open and closed. With one or more gripping heads 110 installed atop a sprinkler cap, rotation of the keyholes 120 by the tines of a turn-on key will screw or unscrew a threaded sprinkler cap.

Figure 12:
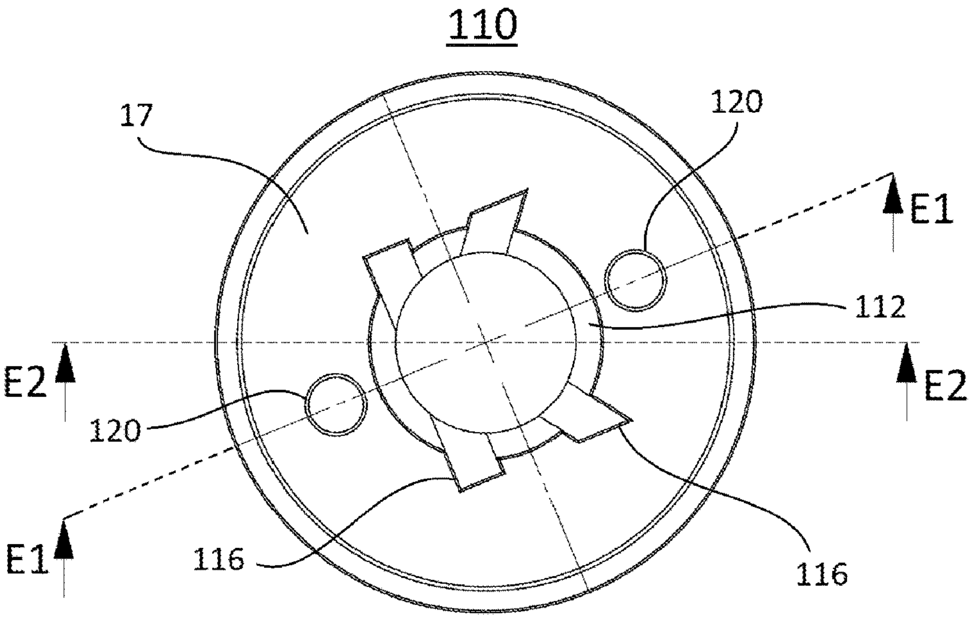
FIG. 12 is a top view of the external gripping head of FIG. 11.

FIG. 12 shows a top view of the external gripping head 110. In an exemplary embodiment, the diameter of the top surface of the gripping head 110 is about 2.25 in. This is the same diameter of the upper surface of gripping head 10, of the upper rim 13, and of the rim 28 of one style of commercial sprinkler cap. To further illustrate the structure of the gripping head 110, two section lines E1-E1 and E2-E2 are defined through this view for further discussion below.

Figure 13:
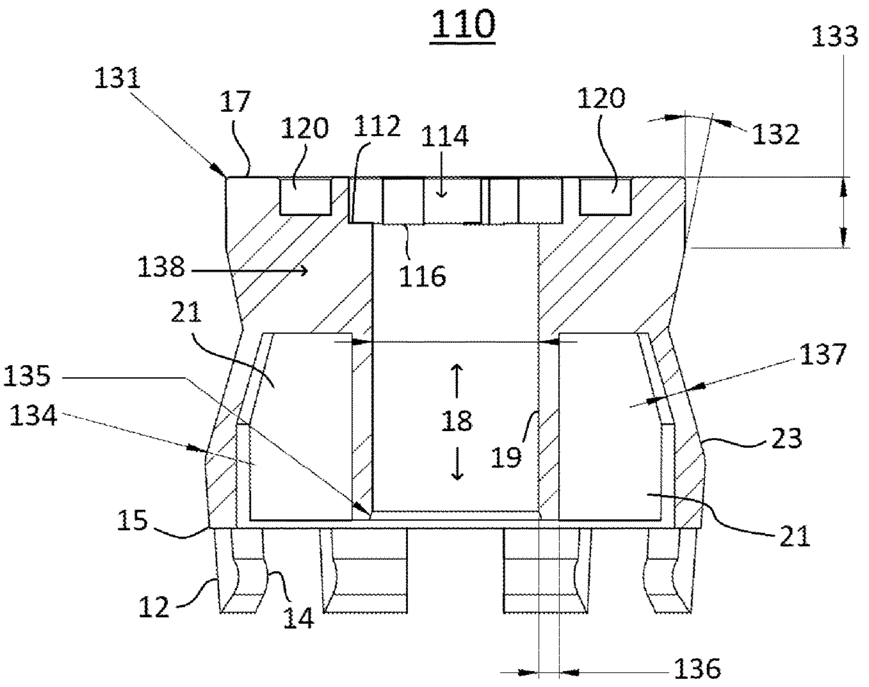
FIG. 13 is a cross sectional side view of the external gripping head of FIG. 11, taken along section lines E1-E1 in FIG. 12.

FIG. 13 shows a cross sectional side view of the external gripping head 110, taken along section lines E1-E1 in FIG. 12. This view illustrates several exemplary dimensional features, which are for purposes of illustration only, and are not intended to limit the scope of the invention to the dimensional examples given. Skilled artisans will recognize that these dimensions are nominal, may be scaled up or down, and each may be given reasonable tolerance, for example, in a range of 10% to 20%. Rounded edge 131 may define a radius of about 0.02 in. Angle 132 may be about 12 degrees. Upper rim 133 may have a height of about 0.35 in. Rounded edge 134 may define a radius of about 0.25 in. The beveled edge 135 at the lower end of channel 18 may have a height of about 0.04 in. slanted at about 20 degrees. Width 136 of inner wall 19 may be about 0.1 in. Width 137 of outer wall 23 may be about 0.1 in. Gripping head 110 also features a solid upper interior portion 138 surrounding the channel 18, to provide greater overall component strength, resulting in less volume for the interior void 21, in comparison to the more hollow configuration of the prior embodiment.

Figure 14:
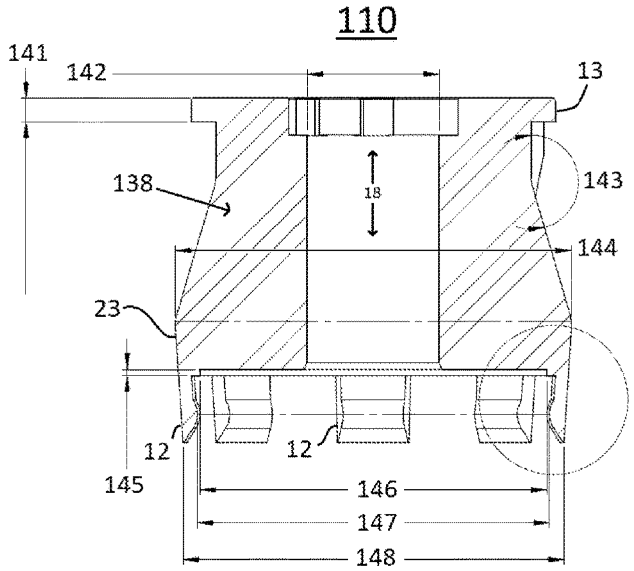
FIG. 14 is a cross sectional side view of the external gripping head of FIG. 11, taken along section lines E2-E2 in FIG. 12.

FIG. 14 is a cross sectional side view of the external gripping head 110, taken along section lines E2-E2 in FIG. 12. Like FIG. 11, this view is similarly provided for illustrative, and not limiting purposes. Height 141 of cap 13 may be about 0.15 in. Width 142 of the channel 18 may be about 0.82 in. Angle 143 may be about 160 degrees. Overall width 144 may be about 2.5 in. Gap 145 may be about 0.04 in. Widths 146, 147, and 148 may be about 2.16, 2.19, and 2.4 in., respectively.

Figure 15:
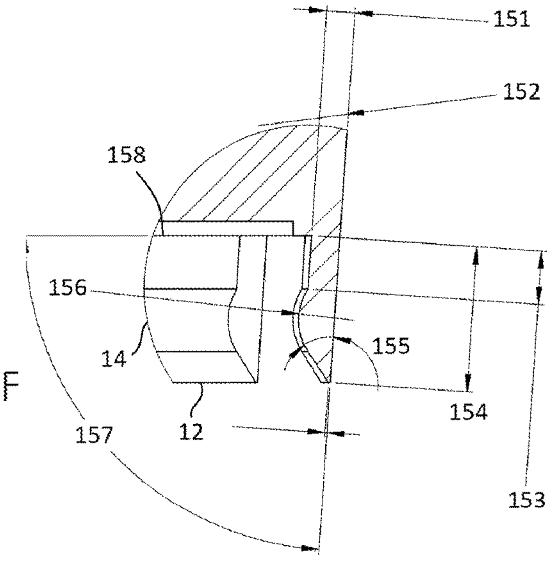
FIG. 15 is a detail view of the portion of FIG. 14 that is enclosed within the circle labeled F.

FIG. 15 is a detail view of the portion of FIG. 14 that is enclosed within the circle labeled F, to illustrate one embodiment of a pawl 12 according to the invention. Like FIG. 11, this view is similarly provided for illustrative, and not limiting purposes. Width 151 of the pawl 12 may be about 0.8 in. The radius indicated at 152 may be about 0.25 in. Pawl length 153 above the finger portion 14 may be about 0.15 in. Overall pawl length 154 may be about 0.4 in. The angle 155 defining the distal shape of the pawl 12 may be about 37 degrees. The radius of the finger portion 14 indicated at 156 may be about 0.16. The angle 157 from the distal end of the pawl 12 to the lower base 158 of the gripping head 110 may be about 86 degrees.

Figure 16:
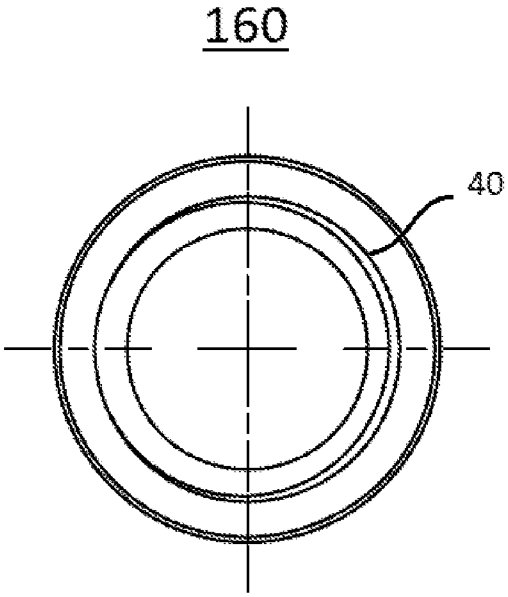
FIG. 16 is a top view of one embodiment of an internal riser extension for use with the gripping head of FIG. 11.
Figure 17:
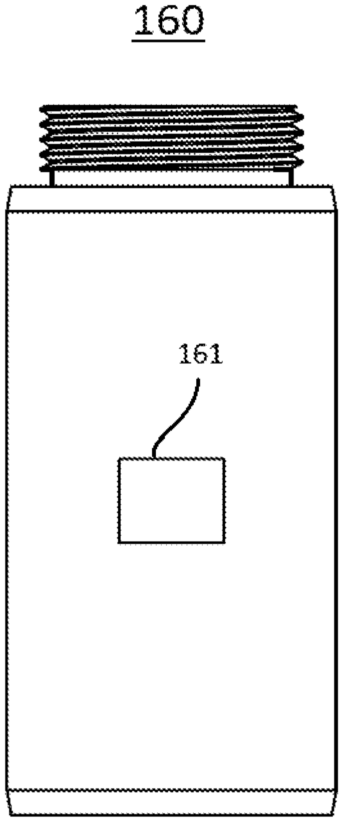
FIG. 17 is a side view of the embodiment of FIG. 16.
Figure 18:
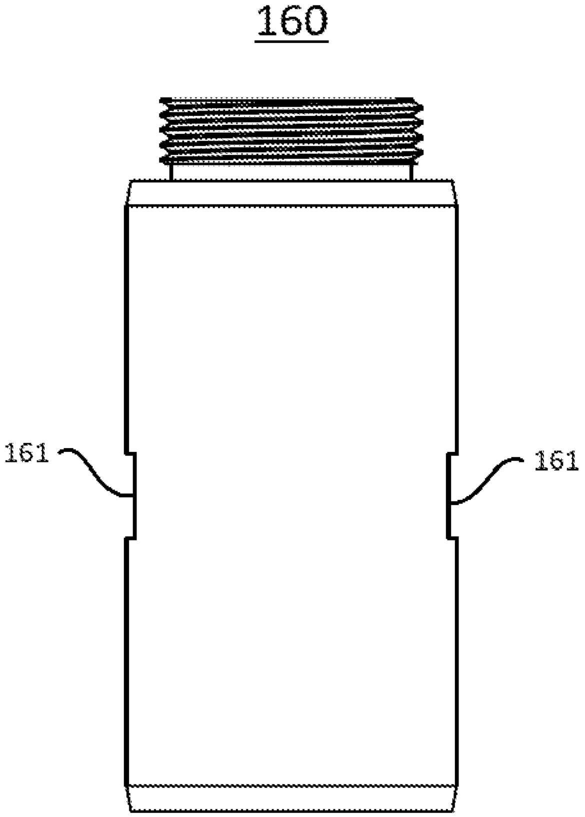
FIG. 18 is another side view of the embodiment of FIG. 16, rotated by 90 degrees with respect to the view shown in FIG. 17.

FIG. 16 is a top view of one embodiment of an internal riser extension 160 for use with the gripping head 110. This view also corresponds to a top view of the internal riser extension 20 shown in FIG. 8. FIG. 17 is a side view of internal riser extension 160. FIG. 18 is another side view of the internal riser extension 160, rotated by 90 degrees with respect to the view shown in FIG. 17. A flattened area 161 may be provided at an intermediate location between the upper and lower ends of the internal riser extension 160, to allow the internal riser extension 160 to be held firmly in place by a tool such as an end wrench when unscrewing or removing a sprinkler head from an upper end of the extension 160, or when unscrewing or removing the extension 160 from a threaded sprinkler riser.

Figure 19:
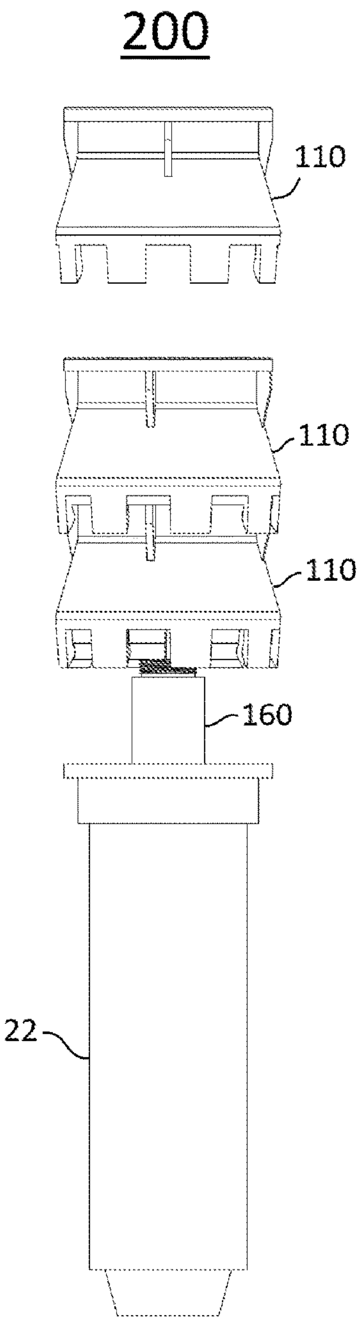
FIG. 19 shows an exploded side view of a stackable sprinkler riser extension kit, in which multiple gripping heads of the embodiment of FIG. 11 are assembled in a stacked configuration.

FIG. 19 shows an exploded side view of a stackable sprinkler riser extension kit, in which multiple gripping heads of the embodiment of FIG. 11 are assembled in a stacked configuration 200. As in the prior embodiment of gripping head 10, gripping head 110 may be stacked onto another gripping head of similar size and configuration by snap-fitting pawls 12 to the rim 28 of another gripping head stacked immediately below, as shown. As in the prior configuration 30, each time a gripping head 10 or 110 is added to a sprinkler riser to raise its overall elevation, an internal riser extension 20 or 160 must be installed as described above to extend the overall length of the riser for engagement with a sprinkler head 27 at the top of the uppermost gripping head. When stacking gripping heads, it is important to maintain dimensional tolerance to ensure that the upper rim 13 of each gripping head snaps securely to the pawls 12 of the gripping head immediately above. Key dimensions to ensure stackability of the gripping heads are the diameter and height of the upper rim 13, and the pawl-to pawl lengths 146, 147, 148 previously defined. In one embodiment, the pawls 12 are constructed so that the dimensions 146 and 148 are, respectively, about 5% less than and greater than the diameter of the top surface of gripping head 10, 110, or the upper rim 13.

Figure 20:
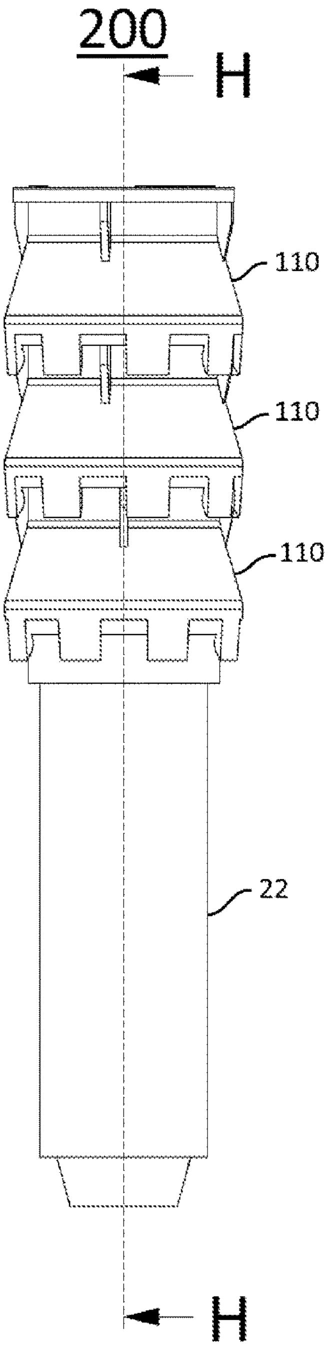
FIG. 20 shows a side view of the stackable sprinkler riser extension kit of FIG. 19 assembled in the stacked configuration.

FIG. 20 shows a side view of the stackable sprinkler riser extension kit assembled in the stacked configuration 200. The stack consists of three gripping heads 110, where the lower gripping head is snap-fit to the cap of a sprinkler 22, the middle gripping head is snap-fit to the upper rim of the lower gripping head, and the upper gripping head is snap-fit to the upper rim of the middle gripping head. Thus, according to the invention, gripping heads and riser extensions are configured to be stackable atop one another, to elevate the sprinkler in multiple stages.

Figure 21:
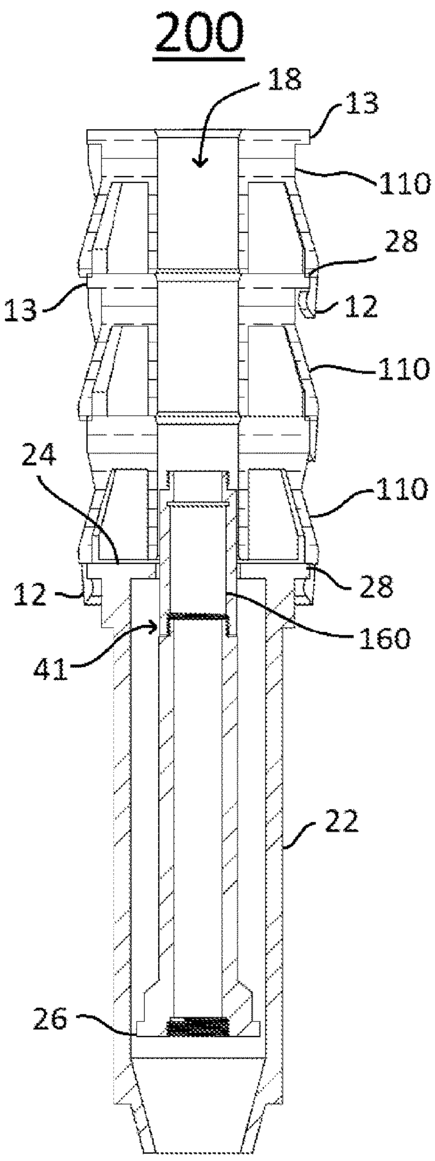
FIG. 21 shows a partial cross sectional side view of the stackable sprinkler riser extension kit as assembled in the stacked configuration of FIG. 20, taken along section line H-H.

FIG. 21 shows a partial cross sectional side view of the stackable sprinkler riser extension kit as assembled in the stacked configuration 200, taken along section line H-H of FIG. 20. This view illustrates the snap-fit engagement of pawls 12 to upper rims 13, or to rim 28 of cap 24 of the sprinkler 22. The lowest-placed internal riser extension 160 is shown installed inside of the lowest gripping head 110. An additional internal riser extension 160 is provided (though not shown) and internally installed with each gripping head to extend the overall length of the sprinkler riser so that a sprinkler head 27 (FIG. 10) may be attached to the topmost internal riser extension 160 and seated atop the top-most gripping head 160.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A riser extension kit configured for installation on a pop-up sprinkler that is operational without such kit installed, the pop-up sprinkler having an enclosure having (i) an outlet end and an inlet end, (ii) a riser having an internal hollow channel installed within the enclosure and in fluid communication with the inlet end of the enclosure, and (iii) a cap having a top side and a bottom side, the riser configured to direct water entering the inlet end to flow through the riser and the cap and to exit a sprinkler head at the outlet end, the riser extension kit comprising:

a gripping head having an upper end and a lower end and configured to engage the enclosure of the pop-up sprinkler, the gripping head having an inner wall defining a channel therethrough, and an outer wall, separated from the inner wall, connecting the upper end to the lower end, wherein the outer wall extends beyond a bottom end of the channel to form an open space below the bottom end of the channel; and a riser extension configured to engage the riser at a first end and the sprinkler head at an opposite second end, the riser extension aligned with the hollow channel and movable through the channel of the gripping head to extend the sprinkler head a distance past the upper end of the channel.

2. The riser extension kit of claim 1, wherein an inner diameter of the channel is substantially equal to an outer diameter of the riser extension such that the riser extension slidably moves through the channel.

3. The riser extension kit of claim 1, wherein the channel is defined substantially through a central longitudinal axis extending between the lower end and the upper end.

4. The riser extension kit of claim 1, wherein the gripping head further comprises at least one internal void surrounding the channel and formed between the inner wall defining a perimeter of the channel and the outer wall of the gripping head.

5. The riser extension kit of claim 4, further comprising a plurality of internal voids defined between the inner wall and the outer wall, wherein each one of the plurality of internal voids is separated from an adjacent internal void by a divider.

6. The riser extension kit of claim 5, wherein each of the dividers extends from the inner wall to the outer wall such that each internal void is separated from an adjacent internal void.

7. The riser extension kit of claim 6, wherein each of the dividers is evenly spaced about the perimeter of the channel.

8. The riser extension kit of claim 6, wherein each of the internal voids defines a volume that is substantially the same as a volume defined by each of the other internal voids.

9. The riser extension kit of claim 1, wherein the lower end of the outer wall comprises a plurality of evenly spaced apart pawls projecting downward.

10. The riser extension kit of claim 9, wherein the plurality of pawls are configured to securely attach the gripping head over the cap.

11. The riser extension kit of claim 9, wherein each of the plurality of pawls further comprises a finger portion that projects inwardly.

12. The riser extension kit of claim 9, wherein each of the pawls is formed as a resilient spring configured to impart a restoring force against the cap when the gripping head is engaged thereto.

13. The riser extension kit of claim 1, wherein the gripping head further comprises means for rotating the gripping head by hand.

14. The riser extension kit of claim 13, wherein the rotation means comprises at least one outwardly projecting tab formed in an outer surface of the outer wall of the gripping head.

15. The riser extension kit of claim 14, further comprising a plurality of outwardly projecting tabs evenly spaced apart about the outer surface of the outer wall.

16. The riser extension kit of claim 1, wherein the riser extension further comprises threads at the first end and the second end, wherein the threads at the first end are internal and configured for threaded engagement with the sprinkler riser, and the threads at the second end are external and configured for threaded engagement with the sprinkler head.

17. The riser extension kit of claim 16, wherein the first end of the riser extension further comprises a rim formed below the internal threads, wherein the rim has a plurality of ridges defined thereon.

18. The riser extension kit of claim 17, wherein the ridges are configured to lock the riser extension on the sprinkler riser when completely threaded together to provide additional resistance to rotational separation of the riser extension from the sprinkler riser.

19. The riser extension kit of claim 1, the gripping head further comprising means to clear debris from an area immediately surrounding the pop-up sprinkler.

* * * * *